United States Patent [19]

Lee et al.

[11] Patent Number: 5,406,161

[45] Date of Patent: Apr. 11, 1995

[54] PIEZOELECTRIC COMPOSITE RECEIVER

[75] Inventors: Yu-Lin Lee; Syh-Yuh Cheng, both of Hsinchu, Taiwan, Prov. of China

[73] Assignee: Industrial Technology Research Institute, Hsinchu, Taiwan, Prov. of China

[21] Appl. No.: 248,872

[22] Filed: May 24, 1994

[51] Int. Cl.⁶ .......................................... H01L 41/08
[52] U.S. Cl. ...................................... 310/324; 381/190
[58] Field of Search ............... 310/321, 322, 324, 334, 310/348, 344; 381/190

[56] References Cited

U.S. PATENT DOCUMENTS

| | | | |
|---|---|---|---|
| 3,708,702 | 1/1973 | Brunnert et al. | 310/8.2 |
| 4,302,695 | 11/1981 | Boyles et al. | 310/324 |
| 4,376,232 | 3/1983 | Martin | 179/110 A |
| 4,379,212 | 4/1983 | Martin | 179/110 A |
| 4,420,706 | 12/1983 | Siebold et al. | 310/324 |
| 4,779,246 | 10/1988 | Dietzsch et al. | 367/157 |
| 4,949,387 | 8/1990 | Andert et al. | 381/190 |
| 4,965,483 | 10/1990 | Abe et al. | 310/324 |
| 5,030,872 | 7/1991 | Boehnke et al. | 310/324 |
| 5,196,754 | 3/1993 | Berthold et al. | 310/324 |

*Primary Examiner*—Mark O. Budd
*Attorney, Agent, or Firm*—W. Wayne Liauh

[57] ABSTRACT

A piezoelectric composite receiver for use in telephones comprising a front cover, a rear cover, and a transducer plate, which is provided with an piezoelectric layer so as to provide the function of an electroacoustic transducer. Each of the front cover and the rear cover has an elliptically-shaped protrusion for clamping the transducer plate therebetween. The elliptically-shaped protrusions allows the transducer plate to freely vibrate in the frequency range of interest (i.e., between 300 Hz and 3,400 Hz), while the sound in the high frequency region (above 3,400 Hz) is effectively suppressed. The front cover and the rear cover are made of a plastic material using an injection molding process, and either the front cover or the rear cover, or both, are provided with an ultrasonic welding loop, which allows the receiver to be affixed using an ultrasound welding device. An induction coil can be imbedded in the outer periphery or an upper portion of the front cover which can be coupled to a hearing aid so as to allow an hearing impaired to utilize a telephone which utilizes the piezoelectric composite receiver.

13 Claims, 6 Drawing Sheets

PIEZOELECTRIC COMPOSITE RECEIVER

FIELD OF THE INVENTION

The present invention relates to piezoelectric composite receivers. More particularly, the present invention relates to an electro-acoustic transducer assembly for use in telephone receivers which comprises a transducer plate carrying a piezoelectric layer placed between two air chambers. The piezoelectric composite receivers disclosed in the present invention involve simplified design, provide improved frequency response characteristic, require reduced manufacturing cost, and can be easily mass-produced. Furthermore, the piezoelectric composite receivers disclosed in the present invention allow an adaptation to be provided which can be connected to hearing aids to thus enable those with hearing impairment to enjoy the benefits of telephone communications.

BACKGROUND OF THE INVENTION

Electroacoustic transducers belonging to the type of piezoelectric transducers have been well-known in the art for us as telephone receivers. In a piezoelectric transducer, which contains a piezoelectric layer attached to a transducer plate, a deflection of the transducer plate is produced when an electric voltage is applied across the piezoelectric layer attached to the transducer plate. This causes an acoustic pressure to be generated. The acoustic pressure so generated is generally proportional to the electric voltage applied thereto. Inversely, when the piezoelectric layer is subject to an acoustic pressure, an electric voltage will be created at the electrodes connected respectively to the opposite sides of the piezoelectric layer upon which the acoustic pressure impinges. The electric voltage thereby created is generally proportional to the acoustic pressure. Because of their light weight, volummetric compactness, and low electric power consumption, the piezoelectric receivers are gradually taking over the place of the traditional electromagnetic receivers.

An important consideration in the design and construction of piezoelectric receivers is to provide a level frequency response. Conventionally, this is done by providing a ring-shaped metallic bearing on the top or from the bottom of the transducer plate, or using an adhesive or a metallic housing having a supporting seat to support the transducer plate. Because of this requirement, conventional piezoelectric receivers require many additional accessory components, such as the ring-shaped metallic bearing, elastic rubber, metallic outer housing, etc. This not only complicates the assembly process, it also contributes to an increased manufacturing cost.

The basic construction of a piezoelectric transducer, or a piezoelectric receiver, can be found in U.S. Pat. No. 3,708,702, in which it is disclosed a transducer plate containing a piezoelectric layer which is supported at its periphery by a ring-shaped elastic body so that the fundamental frequency of oscillation of the transducer plate will have a node line in the region where the transducer is supported. The elastic supporting body, preferably made of silicon rubber, has two opposed pairs of inwardly projecting circular or ring-shaped projections, which engage with and support the transducer plate. The elastic supporting body is constructed so that it extends upwardly to substantial engagement with the outer cover of the transducer. The piezoelectric receiver disclosed in the '702 patent contains a large number of component parts, therefore, it incurs relatively high production costs. Furthermore, the piezoelectric receiver disclosed in the '702 does not contain provisions for connecting to a hearing aid.

U.S. Pat. No. 4,376,232 discloses an improved piezoelectric receiver over those disclosed in the '702 patent. In addition to the basic constructions, which include the ring-shaped elastic body and the inwardly projecting circular or ring-shaped projections, the '232 patent also discloses a plurality of Helmholtz resonators and an attenuation disc provided in the front chamber of the receiver for the attenuation of resonance increases. The piezoelectric receiver disclosed in the '232 patent involves more components than the '702 patent; and it does not contain provisions for connecting to a hearing aid.

U.S. Pat. No. 4,379,212 further improved the piezoelectric receiver disclosed in the '232 patent by replacing the customary silk disk, which is used as an attenuating material in the Helmholtz resonator, with a plurality of narrow slots arranged in the carrier plate. The piezoelectric receiver disclosed in the '212 patent also involves a substantial number of components thus would high production cost. Furthermore, it also does not contain provisions for connecting to a hearing aid so that the receiver can be used by the hearing impaired.

U.S. Pat. No. 4,779,246 discloses a piezoelectric receiver which basically follows the same design as those disclosed in the above mentioned U.S. patents. However, the piezoelectric receiver disclosed in the '246 patent utilizes an improved means for allowing the electrically conducting wires, which are connected to the electrodes of the transducer plate, to be connected to an external source. The piezoelectric receiver disclosed in the '246 allows the assembly procedure to be simplified; however, most if not all of the problems mentioned above remain unsolved.

U.S. Pat. No. 4,949,387 discloses an electroacoustic transducer which can be used either as a microphone, a receiver, or a voice frequency ringing transducer. This electroacoustic transducer involves relatively complicated construction, and an external device is required to open or close the cover provided in its rear chamber in order to achieve these exchangeable functions. Very few applications can be contemplated in which this exchangeable electroacoustic transducer can be used. Furthermore, its relatively complicated design makes production and use of the same difficult. The electroacoustic transducer disclosed in the '387 patent also does not provide adaptations which will allow it to be used by the hearing impaired.

U.S. Pat. No. 5,030,872 discloses an electroacoustic transducer for use as a transducer for telephones having a circular transducer plate arranged in a transducer housing, clamped between two mounting members at its edge region. At least one seating region of the mounting member is of a rotationally asymmetrical shape to attenuate partial oscillations of a higher order. The primary objective of the '872 patent is to attenuate the partial oscillations of the transducer plate characterized by two circular nodal lines; it still involves relatively complicated design and does not provide provisions for the hearing impaired.

Various improvements of piezoelectric receivers are also disclosed in German patents Nos. 3,107,293, 3,402,657, and in Japanese patents Nos. 3-54998, 3-54999, 60-265299, 61-89799, 61-89800, etc. All of the prior art piezoelectric receivers share the same common structure in that they use a pair of metallic outer housings to shield the transducer plates, which are supported by disc-shaped or ring-shaped projections, to form the main body of the receiver. The common drawbacks are also present in all of these above mentioned prior art piezoelectric receivers in that they involve relative complicated designs, thus prohibiting a meaningful reduction in the manufacturing cost. Furthermore, none of the prior art piezoelectric receivers are adaptable for use by the hearing impaired.

SUMMARY OF THE INVENTION

The primary object of the present invention is to overcome many of the shortcomings observed in the prior art piezoelectric telephone receivers. More specifically, the primary object of the present invention is to develop a piezoelectric composite receiver for use in telephones that provides competent level frequency response characteristic, yet it involves a simple design, requires fewer components than the conventional receivers, and can be easily assembled at a substantially reduced manufactured cost.

The piezoelectric composite receiver disclosed in the present invention comprises front and rear covers, a piezoelectric electroacoustic transducer plate placed therebetween to define front and rear chambers, and a plurality of sound transmission apertures in each of the front and rear covers. The present invention also discloses a non-circular, preferably an elliptical or polygonal, or more preferably an elliptical, protrusion for supporting the piezoelectric transducer plate. The piezoelectric transducer plate, which is similar to those taught in the prior art, comprises a transducer plate containing a piezoelectric layer preferably placed in the central region thereof. The front and rear covers of the piezoelectric receiver of the present invention are made from commercially available plastics material using a well-known injection molding process. The entire piezoelectric receiver is sealed together utilizing an ultrasonic welding loop placed on the outer periphery of the front and/or the rear cover to allow quick and easy assembling. Because the present invention requires fewer components and involves a much simplified design, the manufacturing cost can be substantially lowered.

Furthermore, with the design of the piezoelectric receiver disclosed in the present invention, an induction loop can be placed near the outer periphery of the front or rear cover or buried in the top portion of the front cover. The induction loop is connected to the electrodes of the piezoelectric layer so as to generate induction frequency response signals, which can be coupled to a hearing aid to allow those with hearing impairment the convenience of using telephones.

BRIEF DESCRIPTION OF THE DRAWING

The present invention will be described in detail with reference to the drawing showing the preferred embodiment of the present invention, wherein:

FIG. 1b is the bottom view of the front cover shown in FIG. 1a.

FIG. 1c is a side cross-sectional view of the front cover shown in FIG. 1a.

FIG. 1d is the top view of the rear cover shown in FIG. 1a.

FIG. 1e is a side cross-sectional view of the rear cover shown in FIG. 1a.

FIG. 3b is the bottom view of the front cover shown in FIG. 3a.

FIG. 3c is a side cross-sectional view of the front cover shown in FIG. 3a.

FIG. 3d is the top view of the rear cover shown in FIG. 3a.

FIG. 3e is a side cross-sectional view of the rear cover shown in FIG. 3a.

DETAILED DESCRIPTION OF THE PREFERRED EMBODIMENT

As disclosed above, conventional piezoelectric receivers use circular metal rings, ring-shaped protrusions, or circular plates to support the piezoelectric layer. Such a design causes degenerated frequency response. To overcome this problem, prior art piezoelectric receivers, whose piezoelectric layer is supported by the circular metal ring, ring-shaped protrusion or circulate plate, are provided with a metal cover or adhesive. This increases the number of components required in the telephone receiver, complicates the assembling process, and hikes the manufacturing cost. Furthermore, conventional piezoelectric receivers do not provide provisions which will allow them to be coupled to a hearing aid to benefit those with hearing impairment.

The piezoelectric receiver disclosed in the present invention comprises mainly front and rear covers, both of which are made from a variety of commercially available plastic materials using an injection molding process well-known in the art. The front and/or rear covers are provided with (1) an ultrasonic welding loop, (2) an elliptically- or polygonally-shaped protrusion for supporting the piezoelectric layer, (3) at least one sound transmission aperture, and (4) an outlet for the passage of electrically conducting wires. The piezoelectric receiver of the present invention requires only five components. Thus the present invention requires substantially fewer components and involves much simplified design than those disclosed in the prior art teachings, which would require at least six components. This advantage allows the present invention to be more easily assembled with a lowered manufacturing cost.

In the piezoelectric receiver disclosed in the present invention, the piezoelectric layer is supported with an elliptically shaped protrusion, which, as will be shown below, effectively suppresses the undesired high frequency portion of the acoustic signals. The entire receiver assembly is sealed together and assembled via the ultrasonic welding loop provided on the outer periphery of the front and/or the rear cover using an ultrasonic welding process. This allows the piezoelectric receivers of the present invention to be assembled in a faster and more reliable manner. On comparison, conventional piezoelectric receivers, which are assembled using a metal cover or an adhesive means, require a more complicated procedure and are not firmly affixed. Furthermore, the design of the piezoelectric receiver of the present invention, which is made of plastic material, permits an induction coil to be imbedded near the outer or top portion of the front cover without substantially increasing the weight of the receiver. The induction coil can be coupled to a hearing aid so as to allow those with hearing impairment to use telephones, which incorporate the piezoelectric receiver disclosed in the present invention.

The present invention will now be described more specifically with reference to the following examples. It is to be noted that the following descriptions of examples including preferred embodiment of this invention are presented herein for purpose of illustration and description; it is not intended to be exhaustive or to limit the invention to the precise form disclosed.

First Preferred Embodiment

Figure 1A:
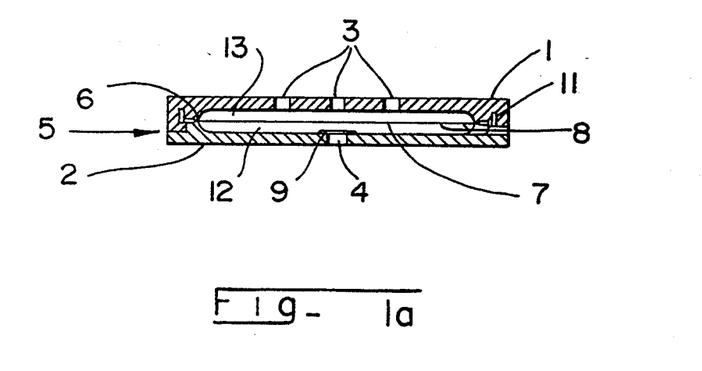
FIG. 1a is a cross-sectional view of the piezoelectric receiver of the present invention according to a first preferred embodiment.
Figure 1B:
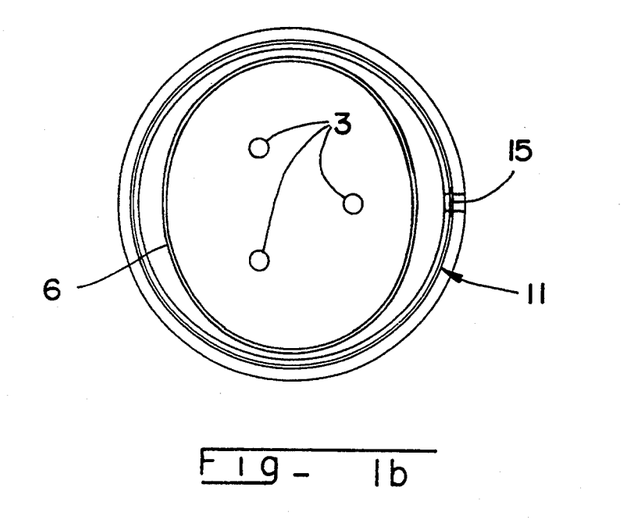
Figure 1C:
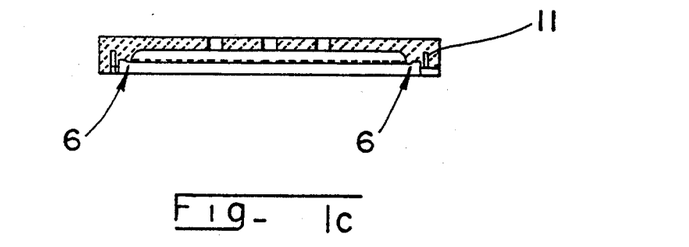
Figure 1D:
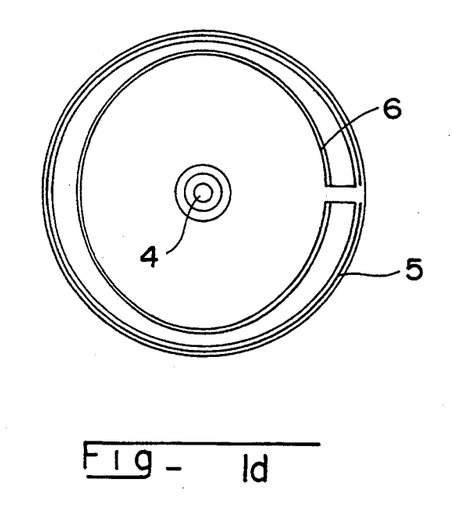
Figure 1E:
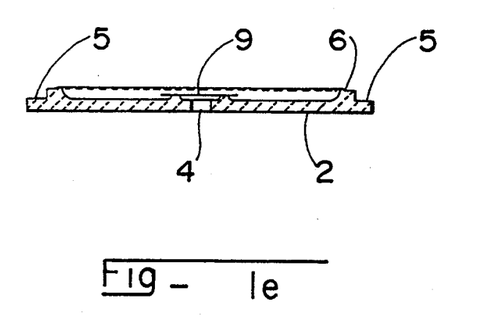

Now referring to the drawings. FIG. 1a is a cross-sectional view of the piezoelectric receiver according to the first preferred embodiment of the present invention. FIGS. 1b and 1c are the bottom view and a side cross-sectional view, respectively, of the front cover shown in FIG. 1a. FIGS. 1d and 1e are the top view and a side cross-sectional view, respectively, of the rear cover shown in FIG. 1a. The piezoelectric receiver 1 of the present invention comprises a front cover 1 and a rear cover 2, both of which are made from commercially available plastics using an injection molding process. A transducer plate, which contains a piezoelectric layer 7, partitions the space defined by the front cover 1 and the rear cover 2 into a front chamber 13 and a rear chamber 12. The front cover 1 contains a plurality of sound transmission apertures 3, and an elliptical protrusion 6 for supporting the transducer plate containing the piezoelectric layer 7. The rear cover 2 contains a sound transmission aperture 4, an elliptical protrusion 6, and a dampening plate 9 placed above the sound transmission aperture 4, and an ultrasonic welding loop 5. An opening 14 is provided between the front cover 1 and the rear cover 2 to allow conductive wires 8 to pass therethrough.

Figure 2:
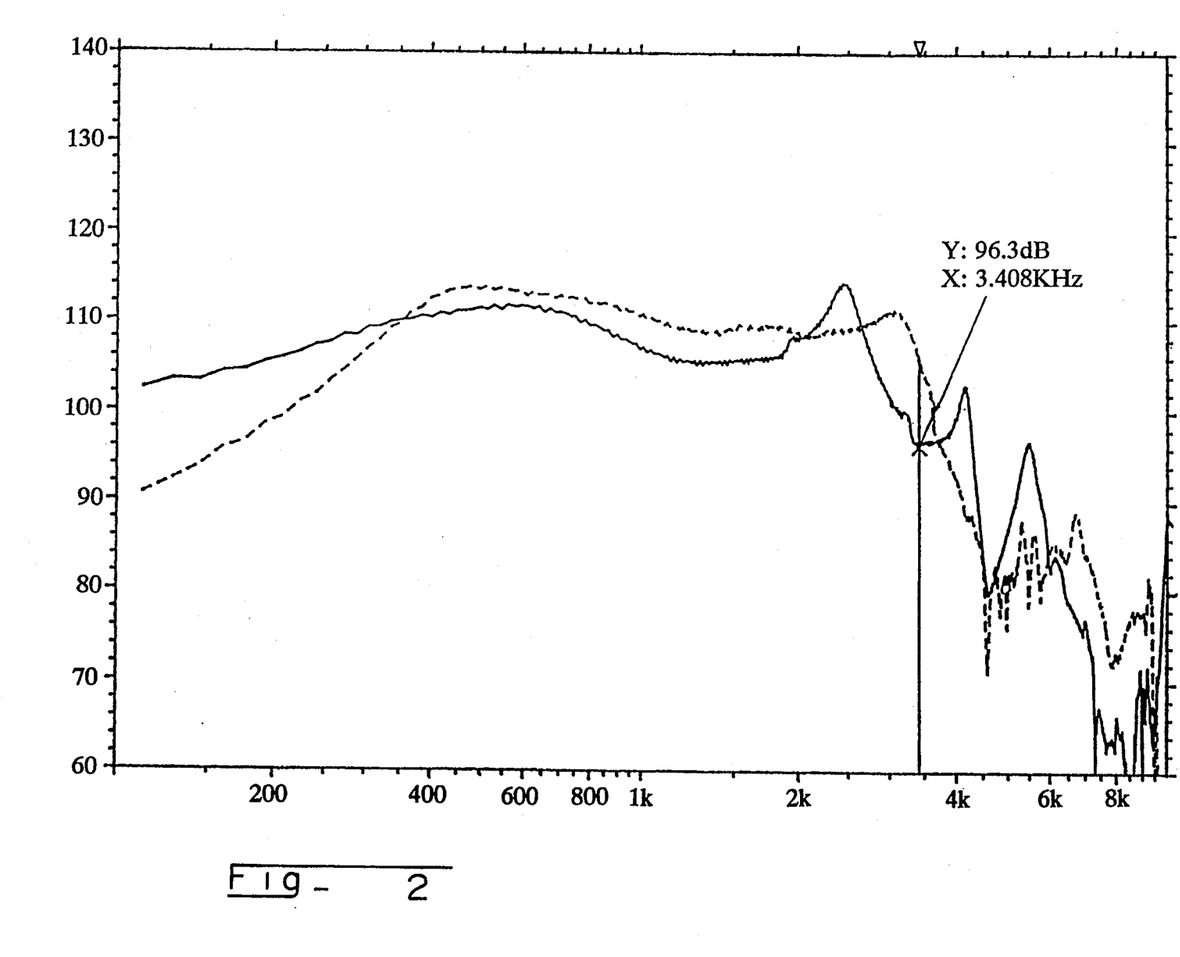
FIG. 2 shows frequency response curves obtained from the piezoelectric receiver of the present invention showing that the high frequency region has been effectively suppressed.

The conductive wires are connected to the opposites sides of the piezoelectric layer 7. The entire receiver unit can be easily assembled by utilizing an ultrasonic welding device above 15 KHz, preferably at 20K~40 KHz to weld the front cover 1 and the rear cover 2 together. The final unit, as shown in FIG. 1a, contains the front and rear covers 1 and 2, the piezoelectric transducer plate 7, the dampening plate 9, and the conductive wires 8. FIG. 2 shows a frequency response curve obtained from the piezoelectric receiver of the present invention. The ordinate denotes the sensitivity in decibels (dB), and the abscissa the frequency in Hz. Telephone receivers have a bandwidth between 300 Hz to 3,400 Hz. The dashed curve in FIG. 2 shows that the elliptical protrusions on the front and rear covers for supporting the piezoelectric plate allow the piezoelectric plate to freely vibrate at the desired frequency region, and the high frequency region. (above 3,400 Hz) is effectively suppressed. FIG. 2 also shows that an acoustic pressure of more than 100 dB (the acoustic pressure at 20 μpa was defined as 0 dB) was obtained at 1 KHz. Results from circular protrusions are shown as solid curve.

Figure 4:
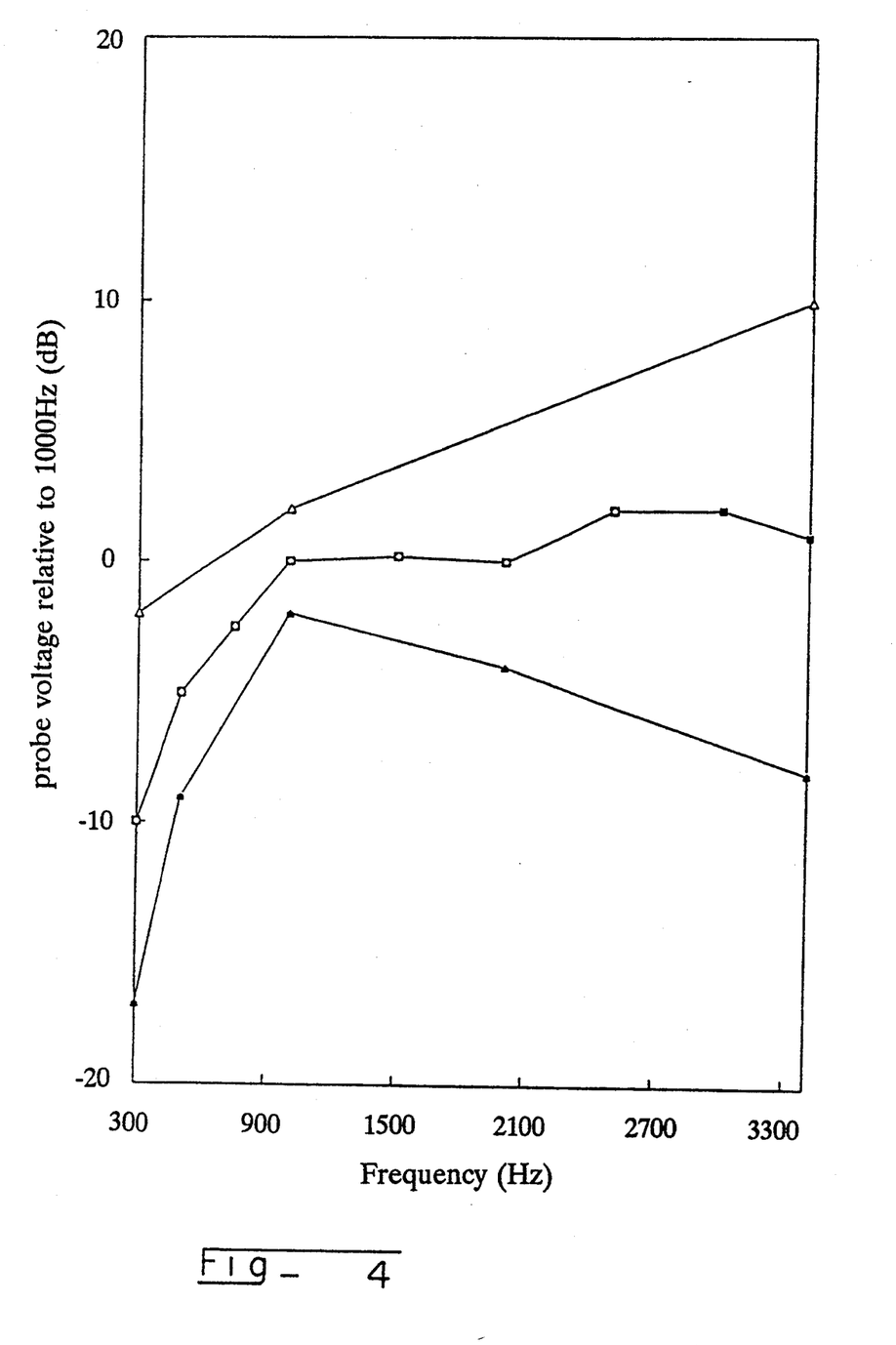
FIG. 4 shows the induction voltage curve generated from the induction coil of the present invention.

FIGS. 1a, 1b and 1c also show an induction coil 11 placed inside the front cover 1 near the outer periphery thereof. The induction coil can be coupled to a hearing aid so as to allow those with hearing impairment to use telephones which incorporate the piezoelectric receiver disclosed in the present invention. FIG. 4 shows the induction voltage curve generated from the induction coil of the present invention. The ordinate denotes the measured probe voltage relative to 1000 Hz in decibels (dB), and the abscissa denotes the frequency in Hz. Lines 21 and 22 bound the tolerance region between which the voltage response should be situated, according to the regulations promulgated by the U.S. Federal Communication Commission (FCC). FIG. 4 shows that the results measured from the present invention which are indicated as line 20, lie between lines 21 and 22. Thus the present invention conforms to federal standard.

Second Preferred Embodiment

Figure 3A:
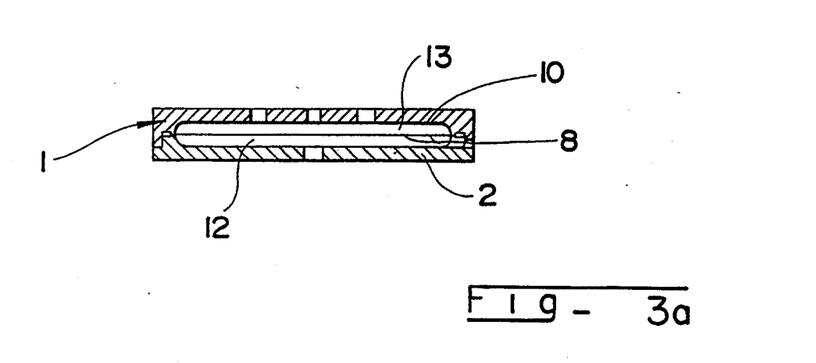
FIG. 3a is a cross-sectional view of the piezoelectric receiver of the present invention according to a second preferred embodiment.
Figure 3B:
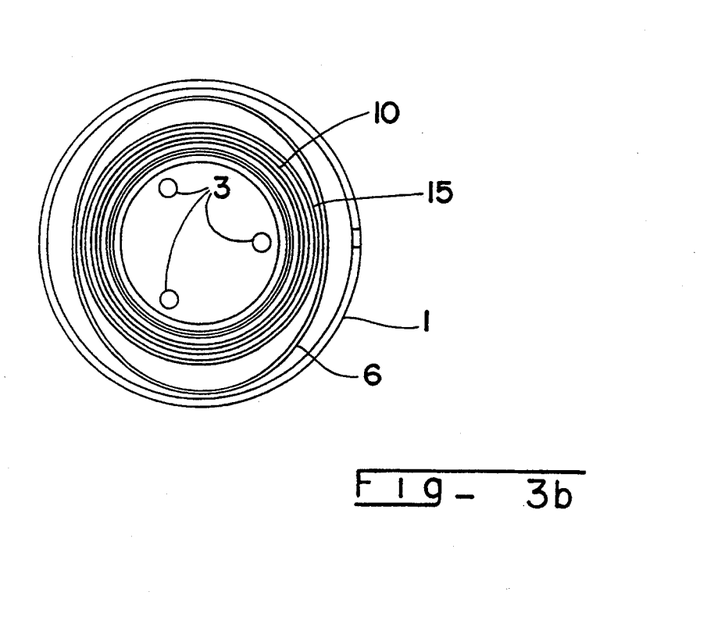
Figure 3C:
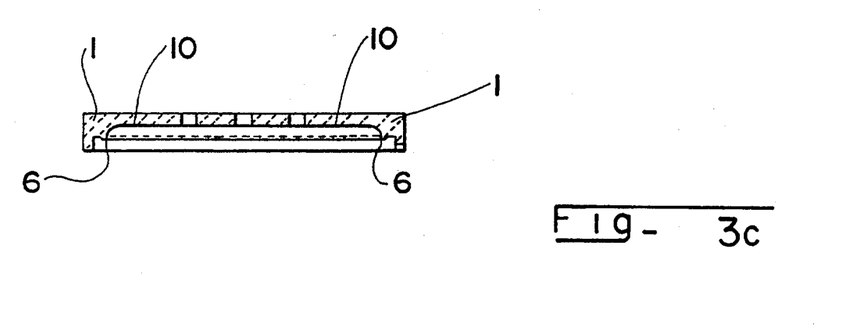
Figure 3D:
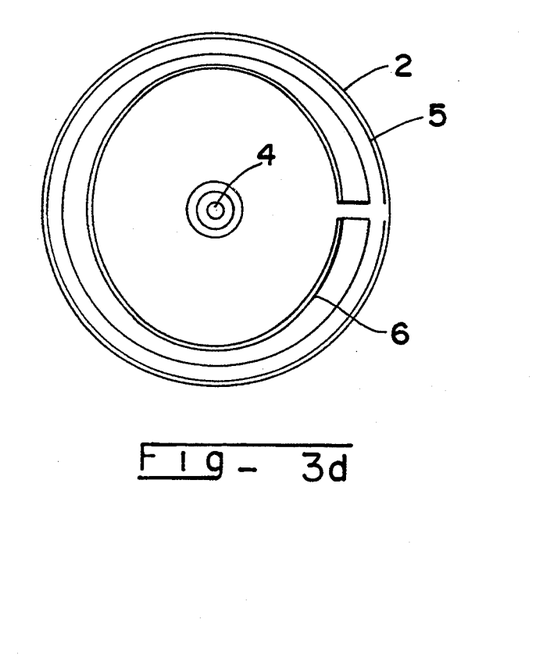
Figure 3E:
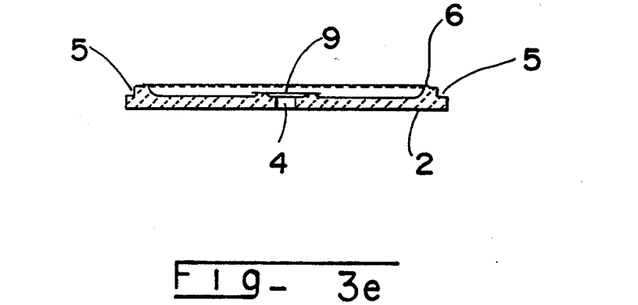

FIG. 3a shows a cross-sectional view of the piezoelectric receiver according to the second preferred embodiment of the present invention. FIGS. 3b and 3c are the bottom view and a side view, respectively, of the front cover shown in FIG. 3a. The piezoelectric receiver 1 of the present invention comprises a front cover 1 and a rear cover 2, both of which are also made from commercially available plastics using an injection molding process. A transducer plate, which contains a piezoelectric layer 7, partitions the space defined by the front cover 1 and the rear cover 2 into a front chamber 13 and a rear chamber 12. The front cover 1 contains a plurality of sound transmission apertures 3, an elliptical protrusion 6 for supporting the transducer plate containing the piezoelectric layer 7. The rear cover 2 also contains a sound transmission aperture 4, a dampening plate 9, and an ultrasonic welding loop 5. FIGS. 3d and 3e are the top view and a side cross-sectional view, respectively, of the rear cover of the second preferred embodiment shown in FIG. 3a.

The piezoelectric receiver according to the second preferred embodiment is very similar to the first preferred embodiment described above, except that the induction coil 10 is placed inside the top portion of the front cover 1. The second preferred embodiment is more advantageous in situations where small diameter is desired; whereas, the first preferred embodiment is more advantageous in situations where thinner thickness is desired. Again, as in the first preferred embodiment, the entire front and rear covers, including the sound transmission apertures, the elliptical protrusions, and the groove for placing the ultrasonic welding loop, can be made in a single injection molding process to reduce manufacturing cost.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A piezoelectric composite receiver comprising:

(a) a front cover, a rear cover, and a transducer chamber defined therebetween, each of said front cover and said rear cover having an elongated non-circular protrusion and at least one sound transmission aperture;

(b) a transducer plate arranged in said transducer chamber and clamped between said elongated non-circular protrusions of said front cover and said rear cover; and (c) a piezoelectric layer provided on said transducer plate;

(d) wherein said front cover and said rear cover being made from a plastic material using an injection molding process, and said front cover and said rear cover are affixed together to form said piezoelectric composite receiver by applying an ultrasound to an ultrasonic welding loop provided on said front cover and/or said rear cover.

2. The piezoelectric composite receiver according to claim 1 wherein said piezoelectric layer having first and second sides and said piezoelectric composite receiver further comprising a pair of conductive wires connected to said first and second sides, respectively, of said piezoelectric layer to conduct an electrical voltage thereto.

3. The piezoelectric composite receiver according to claim 2 wherein said front cover further comprising an induction coil connected to said pair of conductive wires so as to generate an induction voltage which can be coupled to a hearing aid.

4. The piezoelectric composite receiver according to claim 3 wherein said induction coil being placed in an outer periphery portion of said front cover.

5. The piezoelectric composite receiver according to claim 3 wherein said induction coil being placed in an upper portion of said front cover.

6. The piezoelectric composite receiver according to claim 1 wherein said lower cover further comprising a dampening plate placed inwardly of said sound transmission aperture provided in said rear cover.

7. The piezoelectric composite receiver according to claim 1 wherein said elongated non-circular protrusions being elliptically-shaped protrusions.

8. The piezoelectric composite receiver according to claim 1 wherein said elongated non-circular protrusions having the shape of an elongated polygon.

9. The piezoelectric composite receiver according to claim 1 wherein said ultrasound for welding said front cover and said rear cover together having a frequency above 15 KHz.

10. The piezoelectric composite receiver according to claim 1 wherein said ultrasound for welding said front cover and said rear cover together having a frequency between 20 K~40 KHz.

11. A piezoelectric composite receiver comprising:

(a) a front cover, a rear cover, and a transducer chamber defined therebetween, each of said front cover and said rear cover having an elliptically-shaped protrusion, said front cover having a plurality of first sound transmission apertures and said rear having at least one second sound transmission aperture;

(b) a transducer plate arranged in said transducer chamber and clamped between said elliptically-shaped protrusions of said front cover and said rear cover;

(c) a piezoelectric layer provided on said transducer plate; and (d) an induction coil in said front cover which is electrically connected to said piezoelectric layer so as to allow said receiver to be coupled with a hearing aid;

(e) wherein said front cover and said rear cover being made from a plastic material using an injection molding process, and said front cover and said rear cover are affixed together to form said piezoelectric composite receiver by applying an ultrasound to an ultrasonic welding loop provided on said front cover and/or said rear cover.

12. The piezoelectric composite receiver according to claim 11 wherein said induction coil being placed in an outer periphery portion of said front cover.

13. The piezoelectric composite receiver according to claim 11 wherein said induction coil being placed in an upper portion of said front cover.

* * * * *